(12) United States Patent
Grewal et al.

(10) Patent No.: US 7,694,054 B2
(45) Date of Patent: Apr. 6, 2010

(54) GOVERNING ACCESS TO A COMPUTING RESOURCE

(75) Inventors: Jasjit Singh Grewal, Sammamish, WA (US); David Robert Shutt, Seattle, WA (US); Jeremy Kolpak, Seattle, WA (US); Neeraj Ahuja, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/789,995

(22) Filed: Apr. 26, 2007

(65) Prior Publication Data

US 2008/0270659 A1    Oct. 30, 2008

(51) Int. Cl.
*G06F 12/00* (2006.01)

(52) U.S. Cl. .................................. 710/240; 707/10
(58) Field of Classification Search .................. 707/10; 709/227; 710/240
See application file for complete search history.

(56) References Cited

U.S. PATENT DOCUMENTS

| | | | |
|---|---|---|---|
| 6,366,915 B1 | | 4/2002 | Rubert et al. |
| 6,377,993 B1 * | | 4/2002 | Brandt et al. ............... 709/227 |
| 6,466,936 B1 * | | 10/2002 | Ronstrom .................... 707/10 |
| 6,775,660 B2 | | 8/2004 | Lin et al. |
| 6,968,335 B2 | | 11/2005 | Bayliss et al. |
| 7,017,156 B1 | | 3/2006 | Rhee et al. |
| 7,426,653 B2 * | | 9/2008 | Hu et al. ........................ 714/4 |
| 2004/0098374 A1 | | 5/2004 | Bayliss et al. |
| 2005/0010558 A1 | | 1/2005 | Dettinger et al. |
| 2005/0108188 A1 | | 5/2005 | Santosuosso |
| 2005/0192997 A1 | | 9/2005 | Dettinger et al. |

OTHER PUBLICATIONS

Qu., et al., "Preference-Aware Query and Update Scheduling in Web-databases", http://rodos.cs.pitt.edu:8090/aps/online/download.do?uid=02b15eaa0f2ae6b2010f7cf698280008.

Qu, et al., "UNIT: User-centric Transaction Management in Web-Database Systems", http://rodos.cs.pitt.edu:8090/aps/online/download.do?uid=02b15eaa098d28310109f109405a086a.

Zhu, et al., "Adaptive Load Sharing for Clustered Digital Library Servers", http://citeseer.ist.psu.edu/cache/papers/cs/17824/http:zSzzSzwww.cs.ucsb.eduzSz~tyangzSzpaperszSzijdl_cluster.pdf/zhu98adaptive.pdf.

* cited by examiner

*Primary Examiner*—Clifford H Knoll
(74) *Attorney, Agent, or Firm*—Hope Baldauff Hartman, LLC

(57) ABSTRACT

Technologies are described herein for governing access to a computing resource. A proxy receives a request to access a computing resource. In response to the request, the proxy determines whether the request can be granted without consulting a governor for the computing resource. If the request cannot be granted without consulting the governor, the proxy transmits the request to a broker. The broker, in turn, transmits the request to a governor for the computing resource. The governor determines whether the requested access to the computing resource should be granted. The governor generates a response to the request and transmits the response to the broker. The broker, in turn, transmits the response to the proxy. The broker may also request notifications from the governor.

16 Claims, 6 Drawing Sheets

GOVERNING ACCESS TO A COMPUTING RESOURCE

BACKGROUND

A hosted application is a software application where the software resides on servers that are accessed through a wide-area network, such as the Internet, rather than more traditional software that is installed on a local server or on individual client computers. Hosted applications may also be known as Internet-applications, application service providers ("ASPs"), web-based applications, or on-line applications. Hosted applications are commonly utilized concurrently by multiple organizations, called "tenants."

Hosted, multi-tenant applications are often unable to maintain high performance operation and an acceptable level of responsiveness when the number of concurrent operations increases dramatically. For instance, previous hosted, multi-tenant applications are generally able to provide acceptable performance during normal levels of activity. However, when the activity level spikes dramatically, such as during end-of-month processing or other peak periods, previous hosted, multi-tenant systems may become unresponsive.

One method for improving the performance of a hosted, multi-tenant application is to require tenants to perform large processing jobs at night, on weekends, or at other off-peak times. This solution, however, is generally unacceptable to the tenants, which commonly pay a fee for use of the hosted application and expect the hosted application to be performant at all times. Another solution is to install hardware capable of providing an acceptable level of responsiveness even during the highest load periods. This solution, however, can be extremely expensive to implement and maintain, and also results in significantly underutilized server capacity during off-peak periods.

It is with respect to these considerations and others that the disclosure made herein is provided.

SUMMARY

Technologies are described herein for governing access to a computing resource. Through aspects presented herein, incoming requests for access to a computing resource can be throttled to thereby provide an appropriate level of responsiveness to multiple requestors for the same resource. Moreover, an appropriate level of responsiveness may be provided without requiring requesters to modify their behavior, and without the installation of unnecessary hardware capacity.

According to one aspect presented herein, a proxy receives a request to access a computing resource, such as a database utilized within a hosted, multi-tenant application. The request may be received from a client process that desires to access the computing resource. In response to the request, the proxy determines whether the request can be granted without consulting a governor for the computing resource. This determination may be made based on data received from the governor. If the request can be granted without consulting the governor, the proxy itself generates a response to the request that indicates that access may be made to the computing resource.

If the request cannot be granted without consulting the governor, the proxy transmits the request to a broker. The broker, in turn, transmits the request to a governor for the computing resource. The governor determines whether the requested access to the computing resource should be granted. This decision may be made based upon the originator of the request, the performance of the computing resource, and a host of other factors. The governor generates a response to the request and transmits the response to the broker. The broker, in turn, transmits the response to the proxy. If the request to access the computing resource was granted, the proxy returns the result to the requester. If the request was denied, the proxy may throw a resource busy exception thereby indicating that the resource is unavailable.

According to aspects, requests to access the computing resource may be received on behalf of any number of organizations. For instance, in a hosted, multi-tenant application system, the requests may be requests to access a database made on behalf of the tenants. In this embodiment, the governor maintains organization-specific queues for maintaining the requests to access the computing resource for each tenant. The governor dequeues the requests and determines whether to grant or deny each request to access the computing resource.

According to other aspects presented herein, the broker may request notifications from the governor. For instance, in one implementation, the broker is operative to request a notification from the governor in the event that a performance configuration for the computing resource is modified. If the performance configuration for the computing resource is modified, the governor will provide the requested notification to the broker. In turn, the broker may provide a corresponding notification to the proxy.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for governing access to a computing resource. Through the embodiments presented herein, requests to access a computing resource, such as a database utilized by a hosted, multi-tenant application, can be throttled to thereby provide performant access to the resource to all requestors. In this way, requests are granted in a manner designed to minimize the overall impact on application performance and to fairly grant access to the resource to each requestor.

As will be described in greater detail below, a governor is provided herein that acts as an intermediary to requests to access a computing resource. When a request for the computing resource needs to be made, a requesting application originating the request first makes a request to the governor to determine if and when it can access the computing resource. The governor, or a client-side proxy for the governor, then either immediately allows the access, queues the access for scheduled execution, or denies the request. If the request is queued for scheduled execution, the governor informs the client that it can perform the requested access.

In the specific implementations presented herein, the computing resource being accessed is a structured query language ("SQL") database in a hosted, multi-tenant computing system for providing customer relationship management ("CRM") functionality. It should be appreciated, however, that the implementations presented herein may be utilized to govern access to any type of computing resource including, but not limited to, databases, applications, application servers, server computers, network bandwidth or other types of communication resources, random access memory ("RAM"), mass storage facilities, processing capabilities, input devices, output devices, and others.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
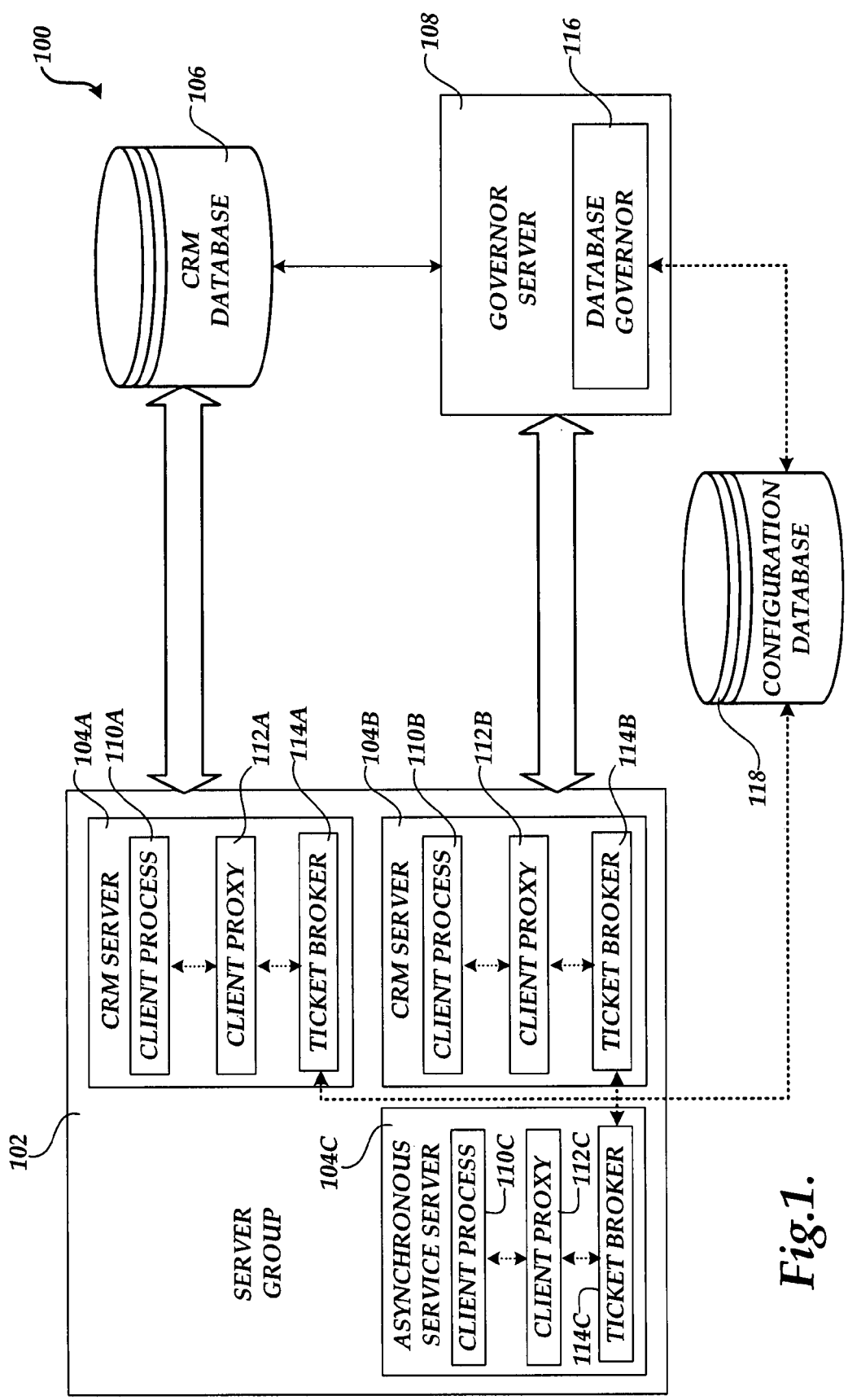
FIG. 1 is a network diagram showing an illustrative network computing architecture and several software components provided by one embodiment described herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for governing access to a computing resource will be described. In particular, FIG. 1 is a network and software architecture diagram that provides details regarding an illustrative operating environment for the embodiments presented herein along with aspects of several software components presented herein. As discussed briefly above, the illustrative computing system shown in FIG. 1 provides a hosted, multi-tenant application for providing CRM functionality. Through the use of the system shown in FIG. 1, multiple organizations, referred to herein as "tenants," may concurrently utilize the computing resources provided by the system, including the CRM database 106. The CRM database 106 is a SQL database utilized for storing data in a CRM system.

In order to provide performant access to the CRM database 106 to each of the tenants, a database governor 116 (also referred to herein as a "governor" or "access governor") is provided that is responsible for governing accesses to the CRM database 106, and for ensuring that the quality of service ("QOS") for accesses to the CRM database 106 for each tenant remains at an acceptable level regardless of the activity being performed for other tenants. Although the database governor 116 is illustrated in FIG. 1 as executing on a separate governor server computer 108, it should be appreciated that the database governor 116 may be executed on a different stand-alone server computer or on one of the other server computers 104 shown in FIG. 1. In this regard, the database governor 116 may be implemented as a stand-alone service that can be executed on any given server computer. It should also be appreciated that although only a single database governor 116 is shown in FIG. 1, in other embodiments multiple database governors may be utilized to govern access to multiple database servers or other types of computing resources.

As will be discussed in greater detail below, the database governor 116 governs requests from software components that desire to access the CRM database 106. For instance, in the implementation illustrated in FIG. 1, a server group 102 is shown that includes the CRM servers 104A-104B and an asynchronous service server 104C. On each of the servers 104A-104C, client processes 110A-110C are executed that require access to the CRM database 106. Requests to access the CRM database 106 are generated by the client processes 110A-110C on behalf of tenants.

As will be described in detail below, in order to access the CRM database 106, each of the client processes 110A-110C instantiates a client proxy 112A-112C (also referred to herein as a "proxy" or an "access proxy"), respectively. Each client proxy 112 communicates with a corresponding ticket broker 114 (also referred to herein as a "broker" or an "access broker"). For instance, the client process 110A executing on the CRM server 104A instantiates a client proxy 112A that communicates with the ticket broker 114A. The ticket broker 114A, in turn, communicates with the database governor 116 to determine whether the client process 110A may access the CRM database 106. The database governor 116 is responsible for granting or denying access requests based on the current demand and state of the server computer hosting the CRM database 106.

As will also be described in greater detail below, in one implementation each of the client processes 110A-110C may request a notification from the database governor 116 when performance configurations change. A performance configuration is a configuration parameter of the database governor 116, the server hosting the CRM database 106, or the servers 104 that affects performance. In one implementation, the database governor 116 and the ticket brokers 114A-114C utilize data stored in a configuration database 118 to configure aspects of their initial operation. Subsequent changes to operational parameters may be transmitted from the database governor 116 to the ticket brokers 114A-114C utilizing a notification. Additional details regarding the process of requesting a notification from the database governor 116 are provided below. Additional details regarding the overall operation of the client proxies 112, the ticket brokers 114, and the database governor 116 are also provided below with respect to FIGS. 2-6.

Figure 2:
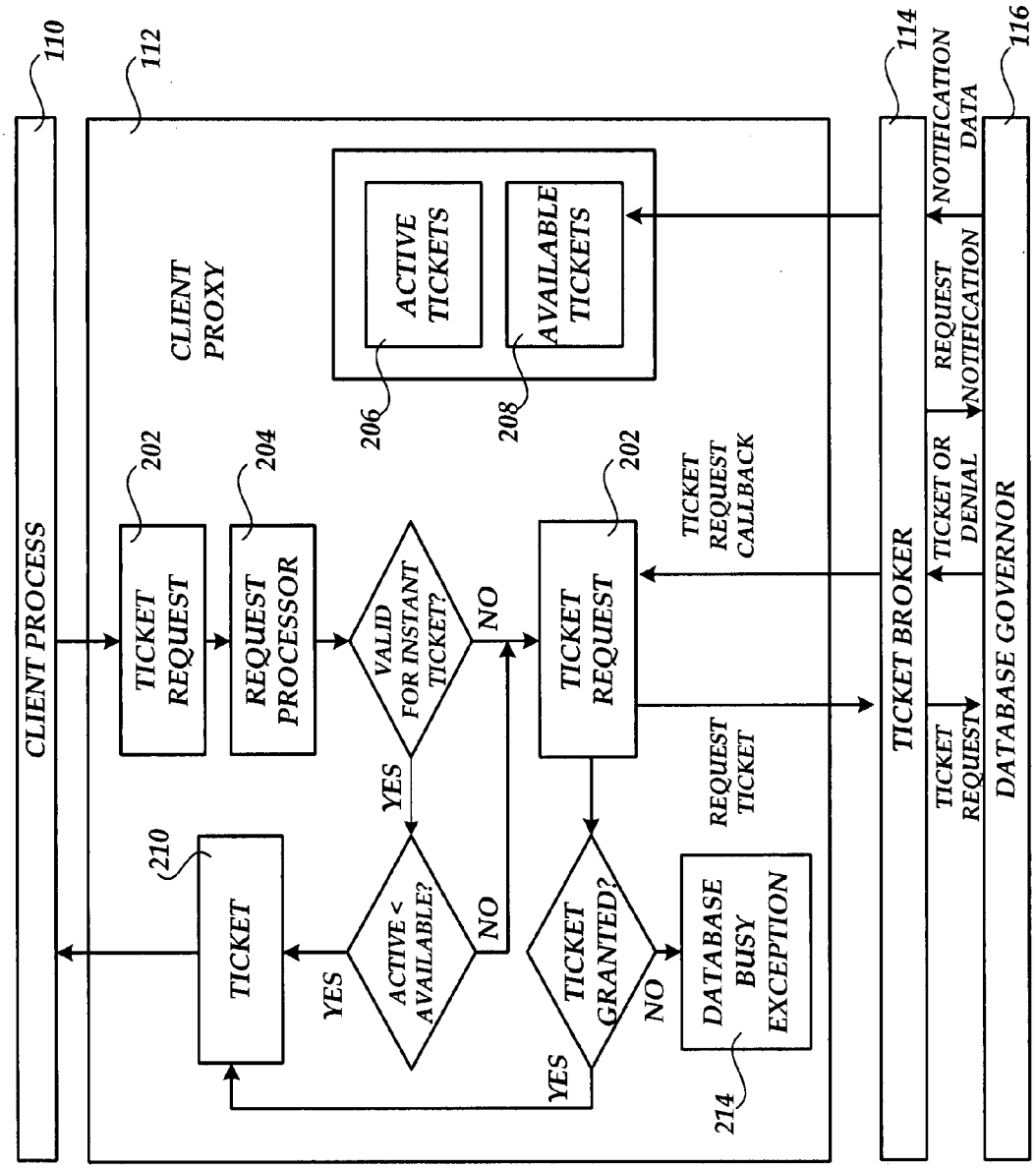
FIGS. 2-4 are software architecture and data flow diagrams showing aspects of the operation of a proxy, a broker, and a governor, respectively, according to various implementations described herein.

Referring now to FIG. 2, additional details will be provided regarding the operation of the client proxy 112. As discussed briefly above, the client proxy 112 is a per client process instance that exposes methods that allow the client process 110 to request access to a computing resource like the CRM database 106. In particular, in one implementation, a request to access the CRM database 106 is made in the form of a ticket request 202. Possession of a ticket entitles the holder to access the CRM database 106. Accordingly, the client process 110 requests access to the database 106 by creating an instance of the client proxy 112 and submitting the ticket request 202 to the newly created instance.

In one implementation, the client proxy 112 allows a predefined number of tickets to be granted to client processes without consulting the database governor 116. In this implementation, the database governor 116 indicates to the client proxy 112 the number of these "instant grant" tickets that may be issued to client processes 110 at any given time. The client proxy 112 maintains data indicating the number of active tickets 206 that have been issued to client processes and the total number of available tickets 208 for instant grant. As will be described in additional detail below, when the number of active tickets 206 is equal to the number of available tickets 208, no further instant grant tickets will be issued until the number of active tickets 206 has been reduced.

The request processor 204 receives the ticket requests 202. In response to receiving a ticket request 202, the request processor 204 determines if the request is the type of request for which an instant grant ticket may be issued. Certain types of request types may not be issued instant grant requests (e.g. computationally expensive processes). If the ticket request 202 is not valid for an instant grant ticket, the request processor 204 transmits the ticket request 202 to the ticket broker 114.

If the ticket request 202 is valid for an instant grant ticket, the request processor 204 determines if the number of active tickets 206 is less than the number of available tickets 208. If so, the ticket request 202 and the corresponding request to access the CRM database 106 can be granted immediately without consulting the database governor 116. In this case, the request processor 204 returns the ticket 210 to the calling client process 110, thereby indicating that access may be had to the CRM database 106. The request processor 204 also increments the number of active tickets 206. The number of active tickets 206 may be later decremented based on a predetermined period of time passing since a ticket was issued or in response to receiving a callback from the client process 110 indicating that the database access has been completed.

If the request processor 204 determines that the number of active tickets 206 is equal to or more than the number of available tickets 208, then the database governor 116 must be consulted to determine whether the client process 110 can access the CRM database 106. Accordingly, in this case, the request processor 204 transmits the ticket request 202 to the ticket broker 114 and awaits a response. When a response is received from the ticket broker 114, the request processor 204 determines whether the response indicates that a ticket was granted to the requesting client process 110. If a ticket was granted, the client proxy 112 returns the ticket 210 to the calling client process 110, thereby indicating that access may be had to the CRM database 106. If a ticket was not granted, the client proxy 112 throws a database busy exception 214, thereby indicating to the calling client process 110 that the database access request was denied by the database governor 116.

As described briefly above, the number of available tickets 208 may be adjusted by the database governor 116 at run-time based upon run-time criteria, such as the current load on the CRM database 106. In this regard, a notification may be provided from the database governor 116 to the ticket broker 114, and subsequently to the client proxy 112, indicating the current number of available tickets 208. Additional details regarding a notification mechanism for receiving such data from the database governor 116 will be described below. Additional details regarding the operation of the ticket broker 114 and the database governor 116 will be provided below with respect to FIGS. 3 and 4, respectively.

Figure 3:
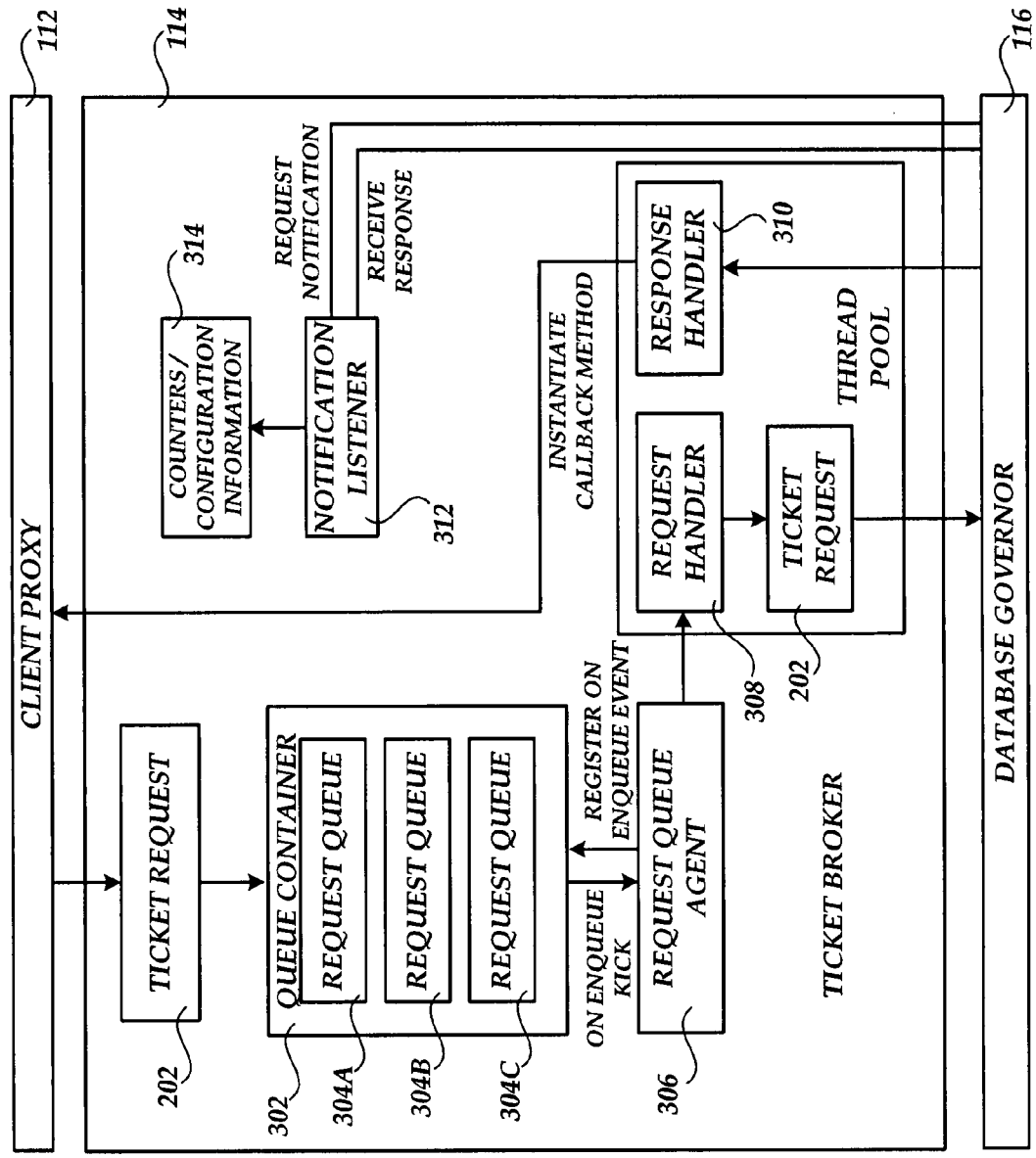

Turning now to FIG. 3, additional details will be provided regarding the operation of the ticket broker 114. As discussed above, each client process 110 that needs to communicate with the database governor 116 does so via a ticket broker 114. In one implementation, there is only one ticket broker 114 for each server 104, thereby limiting the number of connections that must exist between each server 104 and the database governor 116. In other implementations, multiple ticket brokers 114 may be utilized.

It will be appreciated that the architecture shown in FIG. 3 is similar to the architecture for the database governor 116 shown in and described below with reference to FIG. 4. This is because, at run time, multiple users from multiple organizations will be submitting ticket requests on a single server. In order to process all of the ticket requests properly, and limit chattiness and open connections, all ticket requests pass through a single end point, the ticket broker 114. One advantage of this implementation is that each ticket broker 114 has the ability to perform some pre-processing on out-going ticket requests and to provide order to the requests from a single server computer to the database governor 116.

The ticket broker 114 maintains a queue container 302 that includes one or more request queues 304A-304C. The request queues 304A-304C are utilized to store ticket requests 202 and are organized by organization in one implementation. For instance, the request queue 304A may be utilized to store ticket requests 202 for a first organization, while the request queue 304B is utilized to store ticket requests 202 for another organization. When the ticket broker 114 receives a ticket request 202, the ticket broker 114 adds a new entry in the appropriate request queue, which includes any information supplied with the ticket request 202. Information supplied with a ticket request 202 may include, for instance, a reference to utilize to awaken the calling thread when a response to the request is received (e.g. a callback method).

The ticket broker 114 also includes a request queue agent 306 that registers itself to be awakened when a ticket request 202 is enqueued on one of the request queues 304A-304C. On an enqueue event, the request queue agent 306 is awakened and handles processing of the queued ticket requests. In particular, in one implementation, the request queue agent 306 traverses the contents of the queue container 302 and sends requests enqueued thereon to the database governor 116. The ticket broker 114 may utilize a fairness algorithm or other type of dynamic strategy to determine the order in which requests are transmitted to the database governor 116. A request handler 308 is spawned to handle communication of each ticket request 202 to the database governor 116. A response handler 310 is also spawned to listen for a response from the database governor 116 and to provide the response to the appropriate client proxy 112, such as through the use of a specified callback method.

As also discussed briefly above, notification requests may be transmitted to the database governor 116 in order to request a notification in the event of the modification of a performance configuration. In order to provide this functionality, the ticket broker 114 includes a notification listener 312. The notification listener 312 is responsible for requesting such a notification from the database governor 116 and for listening for notifications. If the notification listener 312 receives a notification from the database governor 116, the notification listener 312 may update appropriate counters and configuration information 314 maintained at the ticket broker 114.

Figure 4:
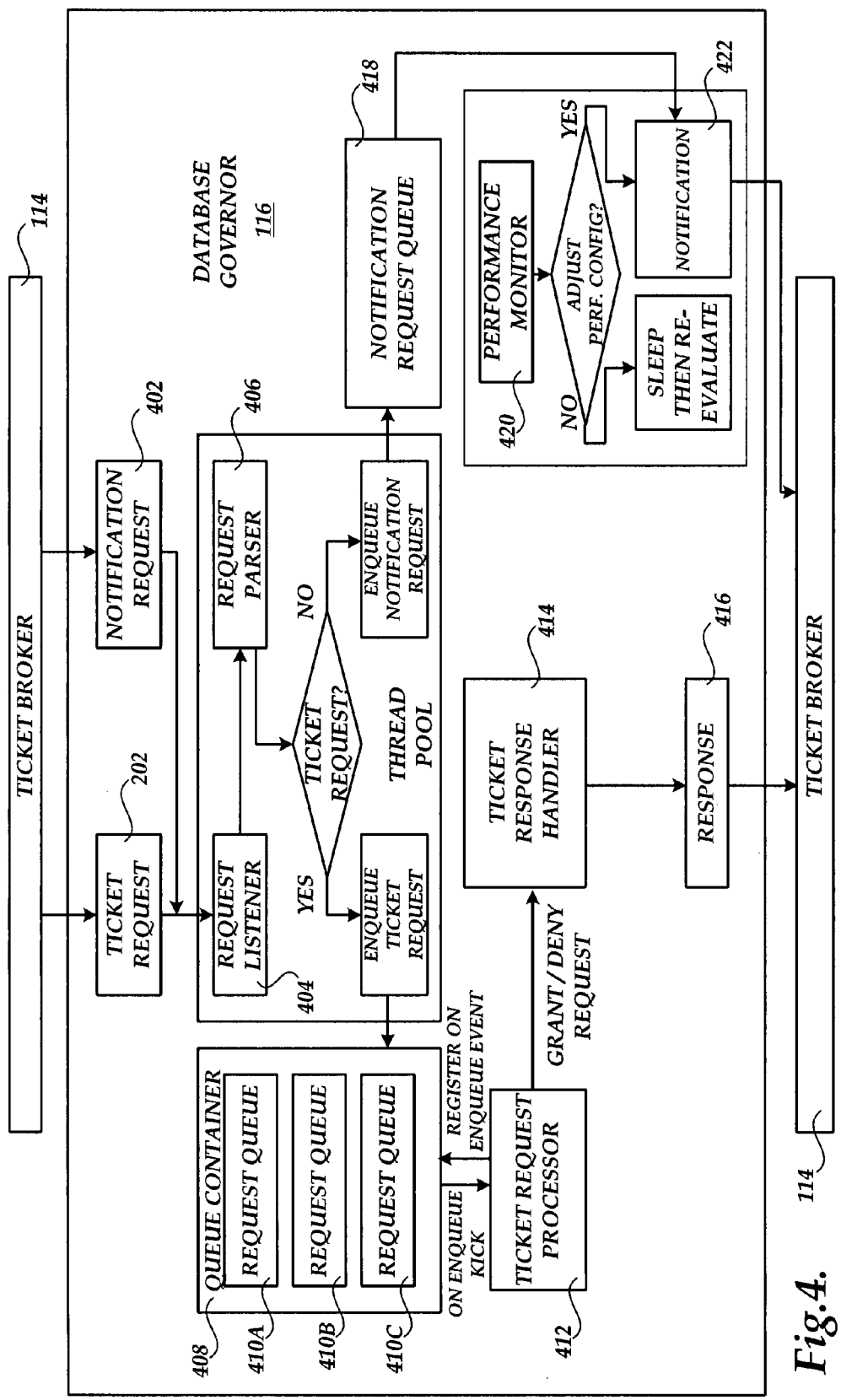

Referring now to FIG. 4, additional details will be provided regarding the operation of the database governor 116. According to one implementation, the database governor 116 utilizes multiple request listeners 404 running in a thread pool that listen to a configured port for ticket requests 202 and notification requests 402. The request listeners 404 are responsible for parsing the requests from clients and for forwarding received requests to an appropriate queue for processing. Each request includes a header indicating which type of request it is.

When a request is received, the request parser 406 determines if it is a ticket request 202. If so, the request parser 406 places the received ticket request 202 into the appropriate request queue 210A-210C in the queue container 308. The request queues 210A-210C are organized by the organization that transmitted the request in the same manner as the queues described above with reference to FIG. 3. If the request is a notification request 402, the request parser 406 places the notification request 402 on a notification request queue 418.

Once a ticket request 202 has been queued, the ticket request processor 412 will be activated. The ticket request processor 412 crawls through each request queue 410 and grants or denies each request based on a scheduling algorithm, described below. Once a ticket request 202 has been processed and a determination made as to whether the corresponding database access should be granted, a ticket response handler 414 is instantiated to transmit the response 416 to the appropriate ticket broker 114.

In one implementation, the ticket request processor 412 is executed in a separate, high-priority thread to ensure high QOS. Moreover, according to implementations, the scheduling algorithm utilized by the ticket request processor 412 may comprise a fairness algorithm designed to provide a high QOS to each tenant or other type of dynamic scheduling algorithm. In particular, in one embodiment, request-contextual data and run-time data are utilized to determine whether a particular request should be granted. For example, as part of the request to the database governor 116, a client may pass along appropriate request-contextual information for use by the database governor 116 in its scheduling decisions.

According to embodiments, a client process 110 may provide information regarding the originator of the request (e.g. end-user, background process, etc.), the type of request, and the target of the request (e.g. information about the tenant making the request which can be utilized to determine which server and database the request is directed to). Additionally, the database governor 116 will maintain additional information outside the bounds of any individual request, such as the actual load on the database 106, the average computational cost of a particular type of request, the number of outstanding requests for a particular tenant or server, and other runtime information about the requests and servers. The scheduling processes performed by the database governor 116 to determine whether each request should be granted or denied may be based on this data.

According to one implementation, the database governor 116 is also operative to maintain a performance monitor 420 for monitoring the performance of the governed computing resource. For instance, in the implementations described herein, the performance monitor 420 monitors the performance of the CRM database 106 and makes data regarding its performance available to the database governor 116. In the event that a performance configuration is modified based on data received from the performance monitor 420, a notification 422 is provided to any ticket brokers 114 that have requested such a notification.

Figure 5:
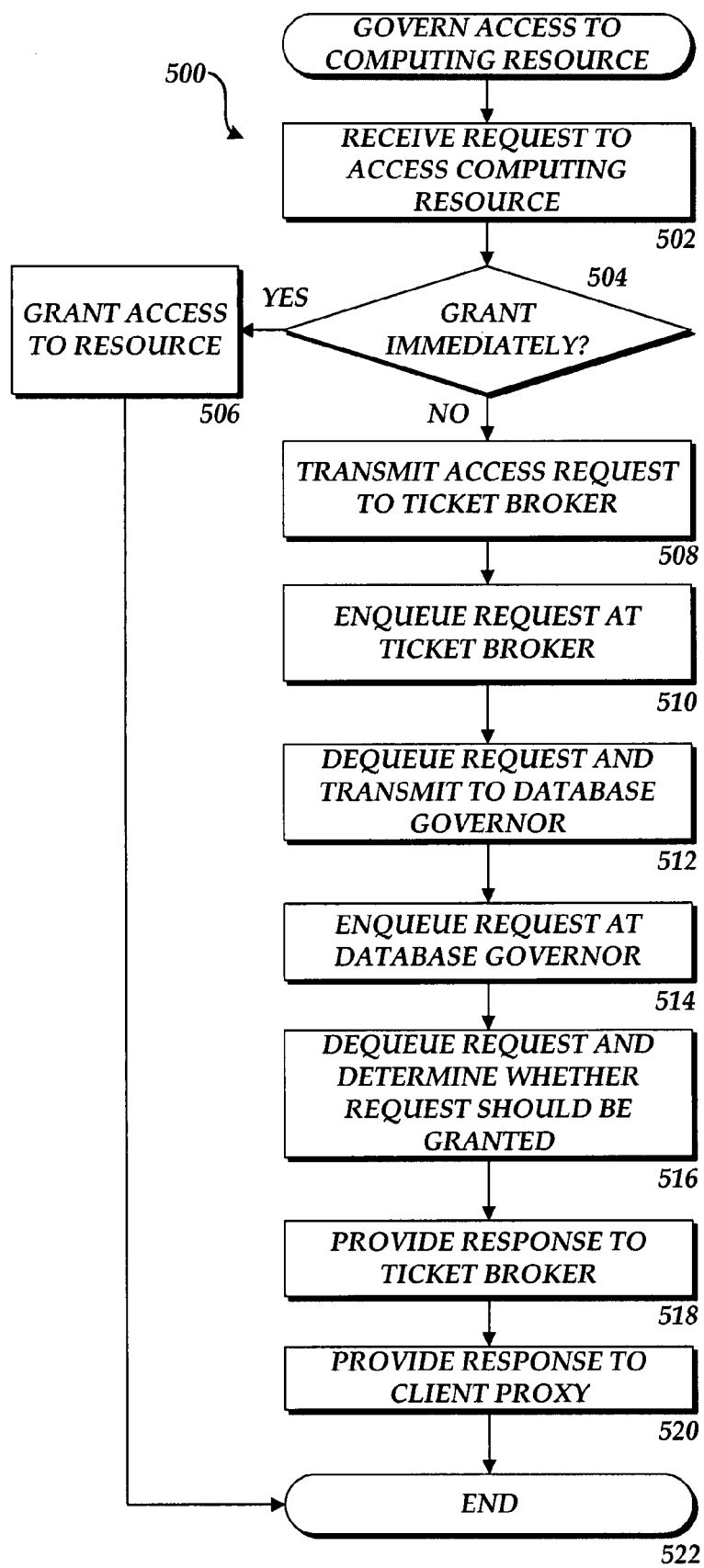
FIG. 5 is a flow diagram showing an illustrative process for governing access to a computing resource according to one implementation described herein.

Referring now to FIG. 5, additional details will be provided regarding the embodiments presented herein for governing access to a computing resource. In particular, FIG. 5 is a flow diagram showing a routine 500 that illustrates aspects of the operation of the client proxy 112, the ticket broker 114, and the database governor 116 in one implementation described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIG. 5 and described herein. These operations may also be performed in a different order than those described herein with respect to FIG. 5.

The routine 500 begins at operation 502, where a client proxy 112 receives a request to access a computing resource, such as the CRM database 106. In response to receiving such a request, the client proxy 112 determines whether the request can be granted immediately without consulting the database governor 116. This process may be performed in the manner described above with respect to FIG. 2. If the client proxy 112 determines that it may grant access to the computing resource without consulting the database governor 116, the routine 500 proceeds from operation 504 to operation 506, where the requested access is granted.

If, at operation 504, the client proxy 112 determines that it may not grant access to the computing resource without consulting the database governor 116, the routine 500 proceeds from operation 504 to operation 508, where the client proxy 112 transmits the request to the appropriate ticket broker 114. At operation 510, the ticket broker 114 receives the request and enqueues the request on one of the queues 304. From operation 510, the routine 500 continues to operation 512, where the ticket broker 114 dequeues the request and transmits the request to the database governor 116.

The database governor 116 receives the request at operation 514 and enqueues the request on one of the queues 410. The routine 500 then continues to operation 516, where the request is dequeued and a determination is made as to whether the request should be granted. As discussed above with reference to FIG. 5, this determination may be made based upon both request-contextual data and run-time data maintained by the database governor 116.

Once a determination has been made regarding the request, an appropriate response is provided at operation 518 to the ticket broker 114 that submitted the request. At operation 520, the ticket broker 114 provides the response to the client proxy 112 that submitted the original request. If the request was granted, the client proxy 112 instructs the appropriate client process 110 that the request was granted. If not, the client proxy 112 throws a database busy exception, thereby indicating to the client process that the request was denied. From operation 520, the routine 500 continues to operation 522, where it ends.

Figure 6:
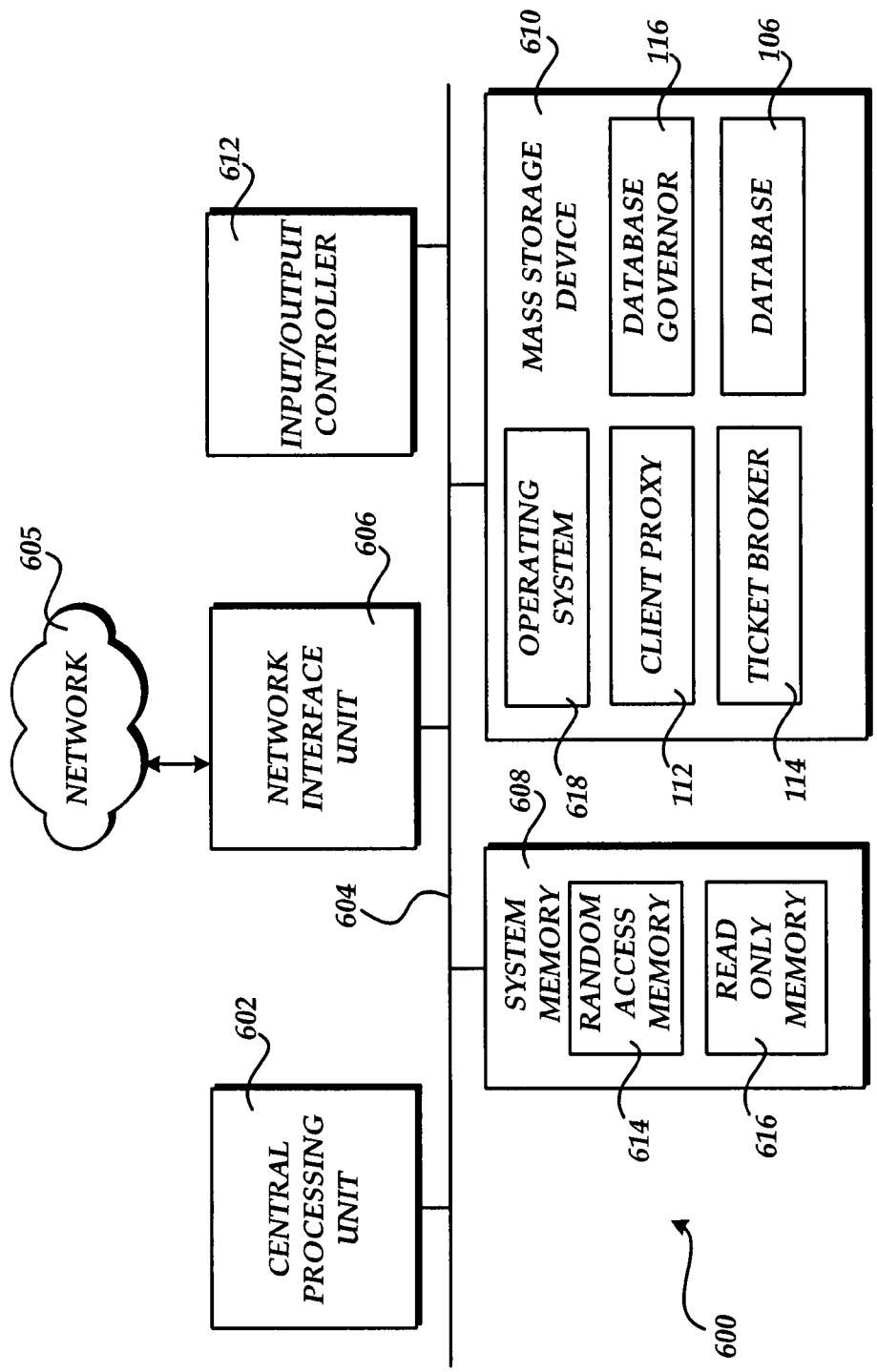
FIG. 6 is a computer architecture diagram showing an illustrative hardware architecture suitable for implementing the computing systems described with reference to FIGS. 1-5.

Referring now to FIG. 6, an illustrative computer architecture for a computer 600 capable of executing the software components described above with respect to FIGS. 2-5 will be discussed. The computer architecture shown in FIG. 6 illustrates a conventional desktop, laptop computer, or server computer and may be utilized to embody any of the computer systems described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 605. The computer 600 may connect to the network 605 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system suitable for controlling the operation of a networked desktop, laptop, or server computer. The mass storage device 610 and RAM 614 may also store one or more program modules. In particular, the mass storage device 610 and the RAM 614 may store the client proxy 112, the ticket broker 114, the database governor 116, and the CRM database 106, each of which has been described above with reference to FIGS. 1-5. Other program modules may also be stored in the mass storage device 610 and utilized by the computer 600.

Based on the foregoing, it should be appreciated that technologies for governing access to a computing resource are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for governing access to a computing resource, the method comprising performing computer-implemented operations for:
   receiving a request to access the computing resource at a client proxy;
   in response to receiving the request, determining at the client proxy whether the request to access the computing resource may be granted without consulting a governor or may not be granted without consulting the governor;
   in response to determining that access to the computing resource may be granted without consulting the governor, generating a response to the request indicating that the request to access the computing resource has been granted;
   in response to determining at the client proxy that the request to access the computing resource may not be granted without consulting the governor, transmitting the request from the client proxy to an access broker;
   receiving the request at the access broker;
   in response to receiving the request, transmitting the request to the governor;
   receiving the request at the governor from the access broker;
   in response to receiving the request at the governor from the access broker, determining whether the request should be granted by the governor;
   in response to determining that the request should be granted, providing a response from the governor to the access broker indicating that the request has been granted by the governor; and
   in response to determining that the request should not be granted, providing a response from the governor to the access broker indicating that the request has not been granted by the governor.

2. The method of claim 1, wherein determining whether the request to access the computing resource may be granted without consulting the governor comprises determining based on data received from the governor whether the request to access the computing resource may be granted without consulting the governor.

3. The method of claim 1, further comprising:
   receiving the response from the governor at the access broker;
   providing the response from the access broker to the client proxy;
   determining at the client proxy whether the response to the request indicates that the request to access the computing resource has been granted by the governor;
   generating a response to the request to access the computing resource indicating that the request has been granted in response to determining that the request to access the computing resource has been granted; and
   throwing an exception indicating that the computing resource is busy in response to determining that the request to access the computing resource has not been granted.

4. The method of claim 1, further comprising:
- transmitting a notification request from the access broker to the governor requesting a notification in the event that a performance configuration for the computing resource is modified; and
- generating a notification from the governor to the broker in the event that the performance configuration for the computing resource is modified.

5. The method of claim 1, wherein the governor is further configured to:
- receive a plurality of requests to access the computing resource, each request comprising data identifying an organization on behalf of which the request has been submitted;
- enqueue each of the requests onto one or more queues, the queue for each request being selected based upon the organization identified in the request;
- dequeue the requests from the queues; and
- determine whether each request should be granted based upon the organization identified in the request and the status of a performance indicator for the computing resource.

6. The method of claim 1, wherein the computing resource comprises a database.

7. A computer-readable storage medium having computer-executable instructions stored thereon which, when executed by a computer, cause the computer to:
- provide a proxy configured to
  - receive a request from a client process to access a computing resource,
  - upon receiving the request from the client process to access the computing resource, determine at the proxy whether the request to access the computing resource may be granted without consulting a governor or may not be granted without consulting the governor,
  - in response to determining that access to the computing resource may be granted without consulting the governor, to generate a response to the request indicating that the request to access the computing resource has been granted, and
  - in response to determining at the proxy that the request to access the computing resource may not be granted without consulting the governor, to transmit the request from the proxy to a broker;
- provide a broker configured to
  - receive the request from the proxy, and
  - pass the request to the governor to access the computing resource; and
- provide a governor configured to
  - receive the request from the broker,
  - in response to receiving the request from the broker, determine whether the request should be granted,
  - in response to determining that the request should be granted, provide a response to the broker indicating that the request has been granted by the governor, and
  - in response to determining that the request should not be granted, provide a response to the broker indicating that the request has not been granted by the governor.

8. The computer-readable storage medium of claim 7, wherein the broker is further configured to receive the response from the governor and to provide the response to the proxy, and wherein the proxy is further configured to provide an indication to the client process indicating that the request has been granted in response to determining that the governor granted the request.

9. The computer-readable storage medium of claim 7, wherein the broker is further configured to request a notification from the governor when a performance configuration for the computing resource changes and wherein the governor is further configured to receive the notification request and to provide a notification to the broker when the performance configuration changes.

10. The computer-readable storage medium of claim 7, wherein the governor is further configured to:
- receive a plurality of requests to access the computing resource, each request comprising data identifying an organization on behalf of which the request has been submitted;
- enqueue each of the requests onto one or more queues, the queue for each request being selected based upon the organization identified in the request;
- dequeue the requests from the queues; and
- determine whether each request should be granted based upon the organization identified in the request and the status of a performance indicator for the computing resource.

11. The computer-readable storage medium of claim 7, wherein the computing resource comprises a structured query language (SQL) database.

12. A computer system for governing access to a computing resource, the computer system comprising:
- a client proxy configured to receive a request to access the computing resource comprising data identifying an organization on behalf of which the request has been submitted, to determine in response to receiving the request whether access to the computing resource may be granted without consulting a governor, to generate a response to the request indicating that the request has been granted in response to determining that access to the computing resource may be granted without consulting the governor, and to transmit the request to a ticket broker in response to determining that access to the computing resource may not be granted without consulting the governor;
- a ticket broker configured to receive the request from the client proxy and in response thereto, to transmit the request to a governor for the computing resource, to receive a response to the request from the governor and to provide the response to the request to the client proxy; and
- a governor configured to receive the request from the ticket broker and in response thereto, to determine whether the request to access the computing resource should be granted, to generate a response to the request indicating whether the request to access the computing resource has been granted by the governor, and to provide the response to the ticket broker.

13. The computer system of claim 12, wherein the client proxy is further configured to:
- receive the response to the request from the ticket broker;
- to determine whether the response to the request indicates that the request to access the computing resource has been granted;
- generate a response to the request to access the computing resource indicating that the request has been granted in response to determining that the request to access the computing resource has been granted; and to
- throw an exception indicating that the computing resource is busy in response to determining that the request to access the computing resource has not been granted.

14. The computer system of claim 12, wherein the ticket broker is further configured to request a notification from the governor in the event that a performance configuration of the computing resource is modified, and wherein the governor is further configured to receive the request for a notification from the ticket broker and to provide a notification to the ticket broker in response to the modification of a performance configuration of the computing resource.

15. The computer system of claim 14, wherein the governor is further configured to:

receive a plurality of requests to access the computing resource;

enqueue each of the requests onto one or more queues, the queue for each request being selected based upon the organization identified in the request;

dequeue the requests from the queues; and determine whether each request should be granted based upon the organization identified in the request and the status of a performance indicator for the computing resource.

16. The computer system of claim 15, wherein the computing resource comprises a database.

\* \* \* \* \*